US010235096B2

(12) United States Patent
Beeson et al.

(10) Patent No.: US 10,235,096 B2
(45) Date of Patent: *Mar. 19, 2019

(54) SYSTEM AND METHOD FOR DYNAMICALLY LOAD BALANCING STORAGE MEDIA DEVICES BASED ON AN AVERAGE OR DISCOUNTED AVERAGE SUSTAINED PERFORMANCE LEVEL

(71) Applicant: Concurrent Ventures, LLC, Johns Creek, GA (US)

(72) Inventors: Jesse D. Beeson, Johns Creek, GA (US); Jesse B. Yates, Atlanta, GA (US)

(73) Assignee: CONCURRENT VENTURES, LLC, Johns Creek, GA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/099,846

(22) Filed: Dec. 6, 2013

(65) Prior Publication Data

US 2015/0160889 A1 Jun. 11, 2015

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0659* (2013.01); *G06F 3/064* (2013.01); *G06F 3/067* (2013.01); *G06F 3/0613* (2013.01); *G06F 3/0619* (2013.01); *G06F 3/0676* (2013.01)

(58) Field of Classification Search
CPC ....... G06F 3/0659; G06F 3/0614; G06F 3/067
USPC ........................................................ 711/114
See application file for complete search history.

(56) References Cited

U.S. PATENT DOCUMENTS

| 5,638,835 | A | 6/1997 | Franz et al. |
| 5,696,990 | A | 12/1997 | Rosenthal et al. |
| 5,740,406 | A | 9/1998 | Rosenthal et al. |
| 5,805,930 | A | 9/1998 | Rosenthal et al. |
| 5,924,126 | A | 7/1999 | Rosenthal et al. |
| 6,081,854 | A | 6/2000 | Priem et al. |
| 6,151,662 | A | 11/2000 | Christie et al. |
| 6,259,705 | B1 | 7/2001 | Takahashi et al. |
| 6,327,638 | B1 * | 12/2001 | Kirby .................... G06F 3/0608 711/4 |
| 6,675,195 | B1 * | 1/2004 | Chatterjee et al. ........... 709/203 |
| 7,171,516 | B2 | 1/2007 | Lowe et al. |

(Continued)

OTHER PUBLICATIONS

Notification of Transmittal of the International Search Report and the Written Opinion of the International Searching Authority, PCT/US2014/069143, dated Mar. 16, 2015.

*Primary Examiner* — Mark A Giardino, Jr.
(74) *Attorney, Agent, or Firm* — Womble Bond Dickinson (US) LLP

(57) ABSTRACT

A storage controller controlling a plurality of storage media devices receives one or more commands from a queue representing a load, identifies a first set of weighted storage region having a slow access rate in the plurality of storage media devices and a second set of weighted storage regions having a fast access rate in the plurality of storage media devices, computes an optimal sustained performance level as function of the first set of weighted storage regions having the slow access rate and the second set of weighted storage regions having the fast access rate, and distributes load based on said computed optimal sustained performance level.

17 Claims, 2 Drawing Sheets

(56) References Cited

U.S. PATENT DOCUMENTS

| | | | |
|---|---|---|---|
| 7,197,618 B2 * | 3/2007 | M'Zoughi et al. | 711/170 |
| 7,325,096 B2 | 1/2008 | Mogi et al. | |
| 7,392,360 B1 * | 6/2008 | Aharoni et al. | 711/170 |
| 7,802,019 B2 | 9/2010 | Shu et al. | |
| 7,937,533 B2 | 5/2011 | Allen et al. | |
| 7,949,830 B2 | 5/2011 | Allen et al. | |
| 7,991,923 B2 | 8/2011 | Shu et al. | |
| 8,015,281 B2 | 9/2011 | Baker et al. | |
| 8,180,979 B2 | 5/2012 | Innan et al. | |
| 8,209,515 B2 | 6/2012 | Schott | |
| 8,312,121 B2 | 11/2012 | Ogawa | |
| 8,321,645 B2 | 11/2012 | Rabii et al. | |
| 8,375,190 B2 * | 2/2013 | Hamilton et al. | 711/170 |
| 8,380,960 B2 * | 2/2013 | Jia et al. | 711/170 |
| 8,416,571 B2 | 4/2013 | Mizumura et al. | |
| 8,566,483 B1 | 10/2013 | Chen | |
| 8,621,141 B2 | 12/2013 | Mudama et al. | |
| 8,650,369 B1 | 2/2014 | Corddry et al. | |
| 8,694,741 B2 | 4/2014 | Yamaguchi et al. | |
| 8,706,962 B2 * | 4/2014 | Belluomini et al. | 711/117 |
| 8,756,199 B2 | 6/2014 | Sutoh et al. | |
| 8,775,868 B2 | 7/2014 | Colgrove et al. | |
| 8,812,490 B1 * | 8/2014 | Cappiello | G06F 17/30442 707/714 |
| 9,021,217 B2 | 4/2015 | Suzuki et al. | |
| 2003/0067975 A1 | 4/2003 | Yamakura et al. | |
| 2010/0010999 A1 | 1/2010 | Gerovac et al. | |
| 2010/0281230 A1 * | 11/2010 | Rabii et al. | 711/165 |
| 2011/0145449 A1 * | 6/2011 | Merchant et al. | 710/40 |
| 2013/0007206 A1 | 1/2013 | Sugimoto | |
| 2013/0085742 A1 * | 4/2013 | Barker et al. | 703/22 |
| 2013/0227111 A1 | 8/2013 | Wright et al. | |
| 2013/0227145 A1 | 8/2013 | Wright et al. | |
| 2013/0232261 A1 | 9/2013 | Wright et al. | |
| 2014/0189196 A1 * | 7/2014 | Kelkar et al. | 711/102 |

\* cited by examiner

SYSTEM AND METHOD FOR DYNAMICALLY LOAD BALANCING STORAGE MEDIA DEVICES BASED ON AN AVERAGE OR DISCOUNTED AVERAGE SUSTAINED PERFORMANCE LEVEL

BACKGROUND OF THE INVENTION

Field of Invention

The present invention relates generally to the field of storage. More specifically, the present invention is related to system and method for dynamically load balancing storage media devices based on an optimal sustained performance level.

Discussion of Related Art

Native Command Queuing (NCQ) are known in the prior art for optimizing the order in which commands (i.e., read and/or write) are executed in a single drive, where the optimization is localized within the single drive. However, storage systems having such NCQ supported drives do not view the storage system holistically as existing techniques, such as Native Command Queuing (NCQ) or storage media device head movement time minimization, look at a single host—slave in a vacuum (i.e., a single storage media device). What is absent in the prior art is a system and method that brings load balancing methodologies typically applied at a macro level (to networks outside of the storage systems or compute systems) down to the micro level within the storage system itself and applied across the storage media devices within that system using criteria specific to storage media devices.

Embodiments of the present invention are an improvement over prior art systems and methods.

SUMMARY OF THE INVENTION

In another embodiment, the present invention provides a storage system comprising: a plurality of storage media devices, each storage media device comprising one or more addressable storage regions, each region assigned a weight based on at least a fast or slow access rate; a storage controller controlling the plurality of storage media devices, wherein the storage controller: receives one or more commands from a queue representing a load; identifies a first set of weighted storage region having a slow access rate in the plurality of storage media devices and a second set of weighted storage regions having a fast access rate in the plurality of storage media devices; computes an optimal sustained performance level as function of the first set of weighted storage regions having the slow access rate and the second set of weighted storage regions having the fast access rate; and distributes load based on the computed optimal sustained performance level.

In another embodiment, the present invention provides a method as implemented in a storage system comprising a plurality of storage media devices, each storage media device comprising one or more addressable storage regions, each region assigned a weight based on at least a fast or slow access rate, a storage controller controlling the plurality of storage media devices, the method comprising: receiving one or more commands from a queue representing a load; identifying a first set of weighted storage region having a slow access rate in the plurality of storage media devices and a second set of weighted storage regions having a fast access rate in the plurality of storage media devices; computing an optimal sustained performance level as function of the first set of weighted storage regions having the slow access rate and the second set of weighted storage regions having the fast access rate; and distributing load based on the computed optimal sustained performance level.

In another embodiment, the present invention provides a method as a non-transitory, computer accessible memory medium storing program instructions for performing a method as implemented in a storage system comprising one or more addressable storage regions, each region assigned a weight based on at least a fast or slow access rate, a storage controller controlling the plurality of storage media devices, wherein the program instructions are executable by a processor to: receive one or more commands from a queue representing a load; identify a first set of weighted storage region having a slow access rate in the plurality of storage media devices and a second set of weighted storage regions having a fast access rate in the plurality of storage media devices; compute an optimal sustained performance level as function of the first set of weighted storage regions having the slow access rate and the second set of weighted storage regions having the fast access rate; and distribute load based on the computed optimal sustained performance level.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
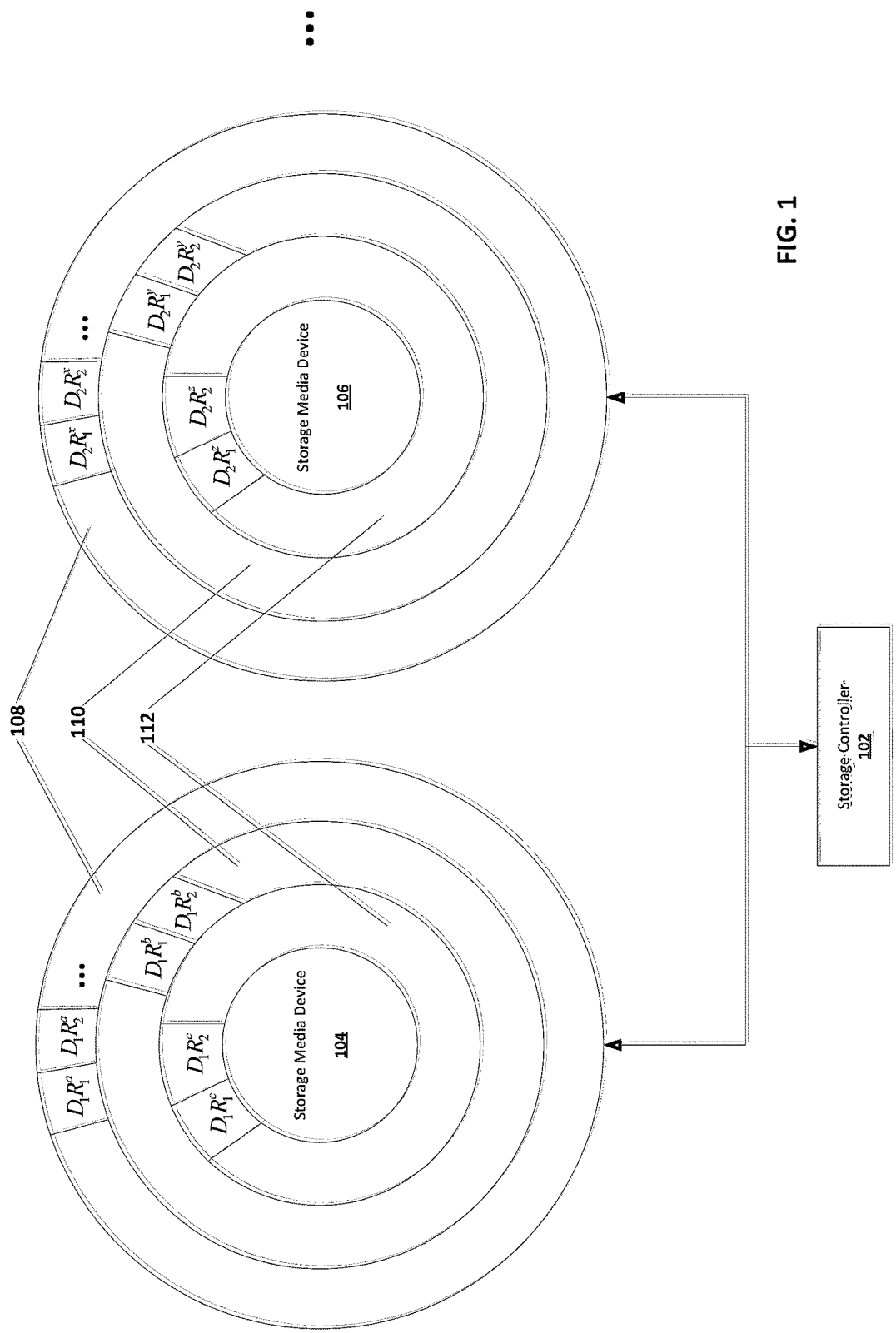
FIG. 1 depicts a storage controller controlling storage media devices having regions of varying access rates.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention views the storage system holistically. Whereas existing techniques, such as Native Command Queuing (NCQ) or storage media device head movement time minimization, look at a single host—slave in a vacuum (i.e., a single storage media device). This invention brings load balancing methodologies typically applied at a macro level (to networks outside of the storage systems or compute systems) down to the micro level within the storage system itself and applied across the storage media devices within that system using criteria specific to storage media devices.

In one embodiment, the present invention's system and method maintains a balance of storage media devices accessing fast regions of their media and storage media devices accessing slow regions of their media to produce a sustained throughput higher than that of randomly accessing the storage media devices, thus targeting the average throughput of a storage media device (e.g., between fast access location and slow access location).

In another embodiment consider a unit of measure called DR (Storage Media Device and a Region within) and applied to rotational storage media devices. In this example DRs are computed by assigning weights for all storage media devices and their sub regions within a storage system based physical characteristics. These regions may be a series of sequential sectors. Other components of the weights are based on recorded historical performance trends and real time actual performance. Then, based on the DRs calculated, one may distribute load across the storage system based upon these DR weights. One distribution scheme would be to target a minimum performance level, in which lower value (lower performance) DRs may be used before higher value DRs to hold high value DRs in reserve, to be used as needed to meet that minimum performance level. Another scheme would be to maximize performance and distribute load across the highest available DRs at all times. An example region-weighting scheme would be to start with a reference region and assigning that a weight of 1.0, typically the lowest performing region would be selected as the reference. Every other regions' weight is assigned as a ratio of its performance to that of the reference. If a region were 50% higher performance than that of the reference its weight would be assigned 1.5. If a region were 10% lower performance than that of the reference its weight would be assigned 0.9.

The DR applies to non-rotational storage media devices as well, simply different weights and regions are defined based on the technology. In some such devices, a DR may include regions based on access type (e.g., access type may be based on read or write, such as the case of a solid-state storage media device where fast and slow access rates may correspond to read or write rates and the solid-state storage media device may have overlapping read and write regions), to account for differing performance levels of each. In addition, some such devices may also be considered a hybrid of differing technologies, such as solid-state and rotational, whereas the performance of each technology differs and in some instances differs further within each technology.

FIG. 1 provides a system-level diagram to understand the principles of the present invention. In this non-limiting example, the present invention's system comprises a storage controller 102 that controls a plurality of storage media devices represented by 104 and 106. Storage media device 104 comprises regions of varying access rates. For example, if storage media device 104 were a rotational disk drive, the outermost region of storage media device 104 is the fast access region as this refers to a region that provides fastest read/write access rates. Along the same lines, the inner-most region of storage media device 104 is a slow access region as this refers to a region that provides slowest read/write access rates. There also may be regions between the fast access rate regions and the slow access rate regions, which we refer to as the mid-range access rate region.

It should be noted that two storage media devices are shown in FIG. 1 only for the sake of simplicity, and that the present invention covers instances where there are more than two storage media devices, as is the case with most network attached storage (NAS) devices or storage devices that are part of a storage area network (SAN).

In the example shown in FIG. 1, the storage media device 104 has three access rate regions shown, a fast access region 108, a mid-range access region 110, and a slow access region 112. It should also be noted that while a three-tier access region (i.e., fast access region 108, mid-range access region 110, and slow access region 112) is disclosed in FIG. 1, the same teachings can be expanded to a multi-tier region where there are a plurality of access rate regions between the fast access rate region 108 and the slow access rate region 112 shown in FIG. 1. In FIG. 1, fast access region 108 of storage media device 104 is further subdivided into a plurality of fast access regions shown as $D_1R_1^a$, $D_1R_2^a$, etc. Similarly, mid-range access region 110 of storage media device 104 is further subdivided into a plurality of regions shown as $D_1R_1^b$, $D_1R_2^b$, etc. and slow access region 112 of storage media device 104 is further subdivided into a plurality of regions shown as $D_2R_1^c$, $D_1R_2^c$, etc.

Also, shown in FIG. 1, fast access region 108 of storage media device 106 is further subdivided into a plurality of fast access regions shown as $D_2R_1^x$, $D_2R_2^x$, etc. Similarly, mid-range access region 110 of storage media device 106 is further subdivided into a plurality of regions shown as $D_2R_1^y$, $D_2R_2^y$, etc. and slow access region 112 of storage media device 106 is further subdivided into a plurality of regions shown as $D_2R_1^z$, $D_2R_2^z$, etc.

In another embodiment, the present invention provides a storage system comprising: a plurality of storage media devices, each storage media device comprising one or more addressable storage regions, each region assigned a weight based on at least a fast or slow access rate; a storage controller controlling the plurality of storage media devices, wherein the storage controller: receives one or more commands from a queue representing a load; identifies a first set of weighted storage region having a slow access rate in the plurality of storage media devices and a second set of weighted storage regions having a fast access rate in the plurality of storage media devices; computes an optimal sustained performance level as function of the first set of weighted storage regions having the slow access rate and the second set of weighted storage regions having the fast access rate; and distributes load based on the computed optimal sustained performance level.

Non-limiting examples of storage media devices are any of, or a combination of, the following: solid-state drive, rotational hard disk drive, hybrid disk drive, or PCI-Express slot disk drive.

Further, the storage media devices may be part of a storage area network (SAN) or may be part of a network attached storage (NAS) device.

Figure 2:
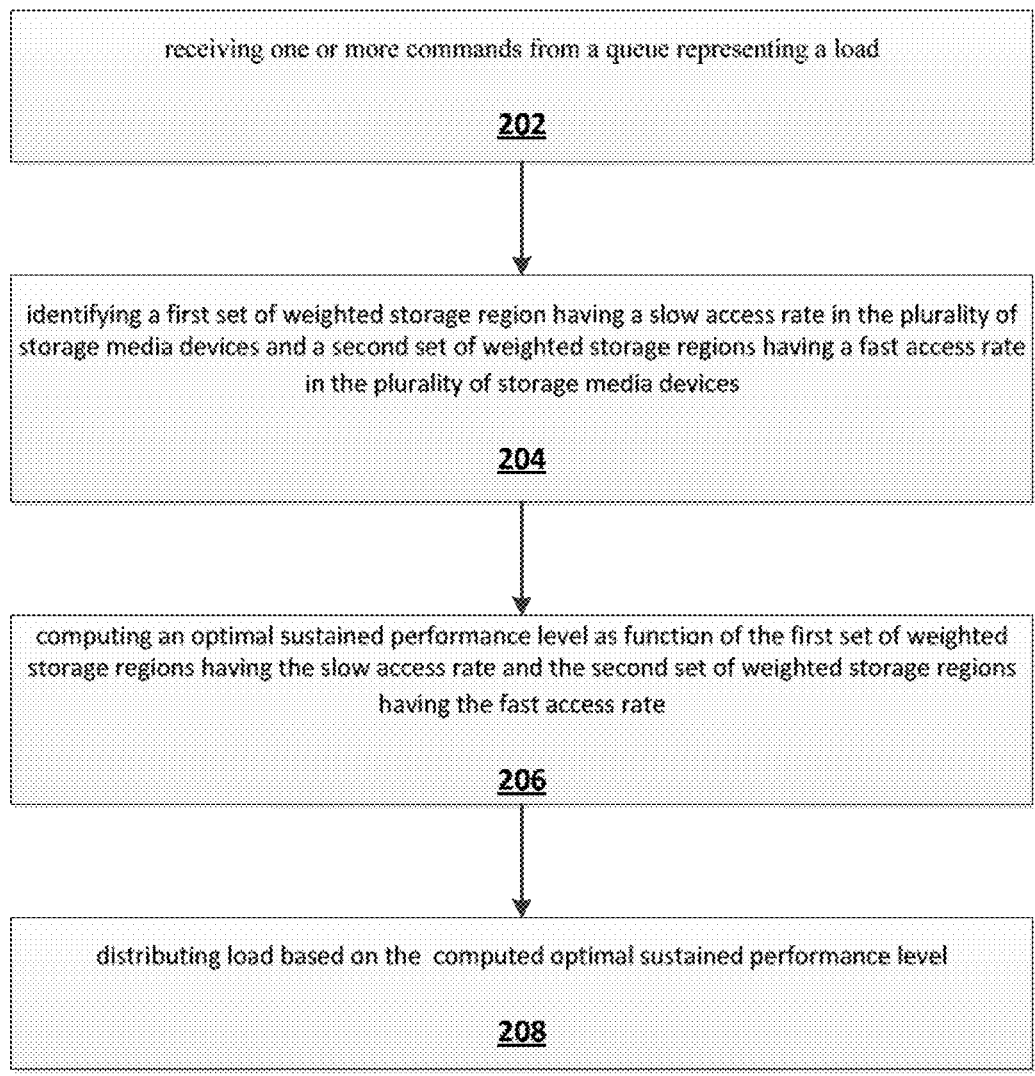
FIG. 2 illustrates one example of the present invention's method to distribute load based on optimal sustained performance level.

In another embodiment, as depicted in FIG. 2, the present invention provides a method as implemented in a storage system comprising a plurality of storage media devices, each storage media device comprising one or more addressable storage regions, each region assigned a weight based on at least a fast or slow access rate, a storage controller controlling the plurality of storage media devices, the method comprising: receiving one or more commands from a queue representing a load—step 202; identifying a first set of weighted storage region having a slow access rate in the plurality of storage media devices and a second set of weighted storage regions having a fast access rate in the plurality of storage media devices—step 204; computing an optimal sustained performance level as function of the first set of weighted storage regions having the slow access rate and the second set of weighted storage regions having the fast access rate—step 206; and distributing load based on the computed optimal sustained performance level—step 208. One example sustained performance level determined in step 206 would be to examine the sets of weighted storage regions presented by step 204 and take the average, this average being used in step 208 to distribute the load by alternating weighted storage regions as necessary to maintain that average over time. Another example sustained performance level determined in step 206 would be to examine the sets of weighted storage regions presented by step 204 and take the average then apply a discount to that average to allow for operational margin, this discounted average being used in step 208 to distribute the load by alternating weighted storage regions as necessary to maintain that discounted average over time.

In another embodiment, the present invention provides a method as a non-transitory, computer accessible memory medium storing program instructions for performing a method as implemented in a storage system comprising one or more addressable storage regions, each region assigned a weight based on at least a fast or slow access rate, a storage controller controlling the plurality of storage media devices, wherein the program instructions are executable by a processor to: receive one or more commands from a queue representing a load; identify a first set of weighted storage region having a slow access rate in the plurality of storage media devices and a second set of weighted storage regions having a fast access rate in the plurality of storage media devices; compute an optimal sustained performance level as function of the first set of weighted storage regions having the slow access rate and the second set of weighted storage regions having the fast access rate; and distribute load based on the computed optimal sustained performance level.

It should be noted that while the specification refers to at least one storage controller, the teachings of the present invention equally applies to a plurality of storage controllers, including multiple, distributed, storage controllers. Also, while, for the sake of simplicity, the system is described as being within a chassis, it should be noted that the entire system need not be co-located within one chassis or physical location, as one or more individual elements may be located as part of a different chassis/location. Additionally, the system may also have parent and child storage controllers, where a parent storage controller makes decisions to balance across child storage controllers, who may then make decisions to balance across their child storage controllers, etc. (eventually hitting storage media devices connected to last storage controller(s) in the chain. As a non-limiting example, a storage controller may balance load across a chassis having a plurality of storage media devices, where a master storage controller may be connected to a plurality of such storage controllers to perform load balancing across a plurality of such chassis, each having a plurality of storage media devices.

The above-described features and applications can be implemented as software processes that are specified as a set of instructions recorded on a computer readable storage medium (also referred to as computer readable medium). When these instructions are executed by one or more processing element(s) (e.g., one or more processors, cores of processors, or other processing elements), they cause the processing element(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing element and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on/within the circuit itself. In some implementations, such as with FPGAs, software may be used to describe hardware circuits, an example of which are FPGA programming files. Such FPGA programming files may also include computer programs, machine code, microcode, firmware, and other software. The FPGA programming files may be stored within an FPGA, ASIC, computer-readable storage media, machine-readable media, or machine-readable storage media.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Those of skill in the art will appreciate that other embodiments of the disclosure may be practiced in network computing environments with many types of computer system configurations, including personal computers, hand-held devices, multi-processor systems, ASIC-based systems, FPGA-based systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method has been shown in the above embodiments for the effective implementation of a system, method and article of manufacture for dynamically load balancing of storage media devices based on an optimal sustained performance level. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/ program, computing environment, or specific computing hardware.

The invention claimed is:

1. A storage system comprising: a plurality of storage media devices, each storage media device comprising one or more addressable storage regions, each region assigned a parameter value that is a weight based on at least a fast or slow access rate; a storage controller controlling said plurality of storage media devices, said storage controller; receives one or more commands from a queue representing a load; identifies a first set of weighted storage regions having a slow access rate in said plurality of storage media devices and a second set of weighted storage regions having a fast access rate in said plurality of storage media devices; computes a parameter value that is an average or discounted average sustained performance level as a function of said first set of weighted storage regions having said slow access rate and said second set of weighted storage regions having said fast access rate; and distributes load over time by alternating weighted storage regions so as to maintain performance level at the parameter value that is said computed average or discounted average sustained performance level, wherein each parameter value that is the weight based on at least the fast or slow access rate is a ratio of performance of the region relative to performance of a reference region.

2. The storage system of claim 1, wherein said storage media devices are any of, or a combination of, the following: solid-state drive, rotational hard disk-drive, hybrid disk drive, or PCI-Express slot disk drive.

3. The storage system of claim 1, wherein said storage media devices are part of a storage area network (SAN).

4. The storage system of claim 1, wherein said storage media devices are part of a network attached storage (NAS) device.

5. The storage system of claim 1, wherein at least one command corresponds to a read request.

6. The storage system of claim 1, wherein at least one command corresponds to a write request.

7. The storage system of claim 1, wherein the parameter value that is the average or discounted average sustained performance level is a computed numerical value.

8. The storage system of claim 1, wherein the parameter value that is the average or discounted average sustained performance level comprises a parameter value that is the average sustained performance level minus a discount to allow for operational margin.

9. A method as implemented in a storage system comprising a plurality of storage media devices, each storage media device comprising one or more addressable storage regions, each region assigned a parameter value that is a weight based on at least a fast or slow access rate, a storage controller controlling said plurality of storage media devices, said method comprising; receiving one or more commands from a queue representing a load; identifying a first set of weighted storage regions having a slow access rate in said plurality of storage media devices and a second set of weighted storage regions having a fast access rate in said plurality of storage media devices; computing a parameter value that is an average or discounted average sustained performance level as a function of said first set of weighted storage regions having said slow access rate and said second set of weighted storage regions having said fast access rate; and distributing load over time by alternating weighted storage regions so as to maintain performance level at the parameter value that is said computed average or discounted average sustained performance level, wherein the parameter value that is the average or discounted average sustained performance level comprises a parameter value that is the average sustained performance level minus a discount to allow for operational margin.

10. The method of claim 9, wherein said storage media devices are any of, or a combination of, the following: solid-state drive, rotational hard disk drive, hybrid disk drive, or PCL-Express slot disk drive.

11. The method of claim 9, wherein said storage media devices are part of a storage area network (SAN).

12. The method of claim 9, wherein said storage media devices are part of a network attached storage (NAS) device.

13. The method of claim 9, wherein at least one command corresponds to a read request.

14. The method of claim 9, wherein at least one command corresponds to a write request.

15. The method of claim 9, wherein each parameter value that is the weighted based on at least the fast or slow access rate is a ratio of performance of the region relative to performance of a reference region.

16. A non-transitory, computer accessible memory medium storing program instructions for performing a method as implemented in a storage system comprising one or more addressable storage regions, each region assigned a parameter value that is a weight based on at least a fast or slow access rate, a storage controller controlling said plurality of storage media devices, wherein the program instructions are executable by a processor to receive one or more commands from a queue representing a load; identify a first set of weighted storage regions having a slow access rate in said plurality of storage media devices and a second set of weighted storage regions having a fast access rate in said plurality of storage media devices; compute a parameter value that is an average discounted average sustained performance level as a function of said first set of weighted storage regions having said slow access rate and said second set of weighted storage regions having said fast access rate;

and distribute load over time by alternating weighted storage regions so as to maintain performance level at the parameter value that is said computed average or discounted average sustained performance level, wherein each parameter value that is the weight based on at least the fast or slow access rate is a ratio of performance of the region relative to performance of a reference region.

17. The computer accessible memory medium of claim 16, wherein the parameter value that is the average or discounted average sustained performance level comprises a parameter value that is the average sustained performance level minus a discount to allow for operational margin.

\* \* \* \* \*